Patented Apr. 15, 1952

2,592,630

UNITED STATES PATENT OFFICE 2,592,630

FORMYLATING TOCOPHEROL MATERIAL

Leonard Weisler, Rochester, N. Y., assignor, by mesne assignments, to Eastman Kodak Company, Rochester, N. Y., a corporation of New Jersey No Drawing. Application October 27, 1949, Serial No. 123,988

17 Claims. (Cl. 260—333)

This invention relates to the treatment of tocopherol material possessing vitamin E activity.

Tocopherols are a related group of compounds possessing vitamin E activity and characterized by having a chroman-like heterocyclic ring structure including a benzenoid nucleus and a phenolic hydroxyl group in the 6 position on the nucleus. Tocopherols occur widely in nature, a particularly good source of tocopherol materials being vegetable oils such as soybean oil, wheat germ oil, cottonseed oil, corn oil and the like. Four tocopherols have been found in nature and designated respectively as alpha-tocopherol, beta-tocopherol, gamma-tocopherol and delta-tocopherol.

Of these naturally-occurring tocopherols, alpha-tocopherol exhibits the highest degree of vitamin E biological activity as measured by the resorption sterility test on rats. The enhanced activity of alpha-tocopherol occurs in the case of the free alpha-tocopherol as well as with alpha-tocopheryl esters, such as the acyl esters.

The lower potency or non-alpha tocopherols are characterized by having at least one aromatic hydrogen atom on the benzenoid nucleus. The naturally-occurring beta-, gamma-, and delta-tocopherols have the aromatic hydrogen atoms ortho to the phenolic hydroxyl atom in the 6 position on the nucleus. These latter tocopherols have the following structures:

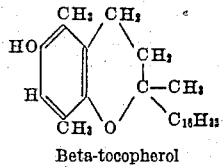
Beta-tocopherol

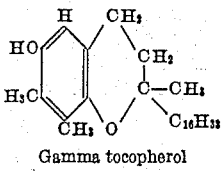
Gamma tocopherol

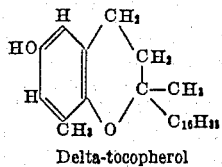
Delta-tocopherol

Since the relatively low potency tocopherols constitute a substantial proportion of the available tocopherol material, it is desirable to provide ways of enhancing the vitamin E biological activity of such low potency tocopherols and thereby increasing the supply of highly active vitamin E material.

It is therefore an object of this invention to provide a new and useful method of treating tocopherol material having relatively low vitamin E biological activity.

It is a further object of the invention to enhance the potency of tocopherol material normally exhibiting lower vitamin E activity than alpha-tocopherol.

Another object of the invention is to provide a simple method of treating tocopherols having at least one aromatic hydrogen atom on the benzenoid nucleus.

Another object of the invention is to provide a useful method of replacing aromatic hydrogen atoms on the nucleus of low potency tocopherol material with methyl groups.

Another object of the invention is to provide an effective method of formylating tocopherol material.

Another object of the invention is to provide a method of introducing substituent groups on the nucleus of tocopherol material ortho to the phenolic hydroxyl group without objectionable polymerization or decomposition of such tocopherol material.

Another object of the invention is to provide a new method of treating beta-, gamma- and delta-tocopherols to convert such tocopherols to material which is readily reducible to alpha-tocopherol of substantially higher potency than said tocopherols being treated.

Other objects will be apparent from the description and claims which follow.

These and other objects of the invention are attained by reacting together a trihalomethane, an alkaline material and tocopherol material characterized by having at least one aromatic hydrogen atom on the benzenoid nucleus and thereafter hydrolyzing the product of said reacting, said reacting and hydrolyzing being effective to formylate the tocopherol material being treated by introducing substituent formyl groups on the nucleus of the tocopherol in the positions normally occupied by aromatic hydrogen atoms. The substituent formyl groups can thereafter be reduced to methyl groups whereby the vitamin E biological activity of the tocopherol material being treated is substantially enhanced.

The process embodying this invention is applicable for treating any low potency tocopherol, whether natural or synthetic, having at least one aromatic hydrogen atom on the benzenoid nucleus. It as particularly effective for treating those tocopherols having an aromatic hydrogen atom ortho to a phenolic hydroxyl group, such as beta-, gamma- and delta-tocopherols. The low potency tocopherols can be treated singly or in admixtures with each other and/or with alpha-tocopherol, the removal of alpha-tocopherol prior to treatment in accordance with this invention being unnecessary since alpha-tocopherol is not deleteriously affected by the treatment.

The process embodying the invention is desirably used in commercial practice for treating tocopherol material contained in vegetable oils, preferably after concentration of the tocopherol content of the oils. Tocopherol concentrates of vegetable oils can be obtained by high vacuum distillation, saponification, solvent extraction, selective adsorption or similar concentrating treatment or by combinations of these and similar well-known concentrating processes. The process is equally applicable for treating synthetically prepared tocopherol material as, for example, the tocopherols obtained by condensation of phytol with a methyl substituted hydroquinone.

The formylation of beta-tocopherol yields 7-formyl beta-tocopherol which is readily reduced to alpha-tocopherol. Formylation of gamma-tocopherol yields 5-formyl gamma-tocopherol which upon reduction also gives alpha-tocopherol. Formylation of delta-tocopherol usually gives a mixture of 5-formyl delta-tocopherol and 5,7-formyl delta-tocopherol, the former being reduced to beta-tocopherol and the latter to alpha-tocopherol. Thus the combined process of formylation and reduction is effective to enhance the vitamin E biological activity of relatively low potency tocopherol material as disclosed and claimed in the copending application of Weisler Serial No. 123,986 filed October 27, 1949.

In carrying out the formylation of tocopherol material in accordance with this invention, the tocopherol material being treated is reacted with a trihalomethane and an alkaline material. Any of the trihalomethanes or haloforms may be used such as chloroform, bromoform, iodoform or fluoroform, the gaseous fluoroform being less desirably employed because of handling difficulties.

Any of the well-known alkaline materials which are capable of furnishing hydroxyl ions in aqueous solution can be used, the strong alkalies such as the group I-A metal hydroxides being desirably employed. Suitable alkaline materials include the alkali metal carbonates such as sodium and potassium carbonate, and the group I-A metal hydroxides such as sodium hydroxide, potassium hydroxide, lithium hydroxide and the like, and similar alkaline materials.

Reaction is preferably effected in an inert atmosphere to minimize oxidative effects during the reaction, suitable conditions being readily attained by bubbling nitrogen or similar inert gas through the reaction mixture during the reaction. Following the reaction between the tocopherol being treated, and the trihalomethane and alkaline material, the reaction product is hydrolyzed with water, preferably in the presence of hydrogen ions. Hydrolysis is readily effected by acidifying the reaction mixture with aqueous mineral acid and the hydrolysis reaction is accelerated by the application of heat to the acidified mixture.

The resulting formylated tocopherol material is thereafter subjected to reduction whereby the substituent formyl groups are reduced to methyl groups and the vitamin E biological activity of the material being treated is enhanced. Reduction is effected by treating the formylated tocopherol material with zinc and mineral acid, by zinc and mineral acid in the presence of mercury as catalyst, by catalytic hydrogenation at elevated pressures in the presence of a catalyst such as nickel or palladium, by treatment with a soluble metal hydride such as lithium aluminohydride, lithium borohydride or aluminum hydride followed by hydrolysis to give a hydroxymethyl group which is thereupon reduced with zinc and mineral acid to a methyl group, or by similar reduction process.

The invention is illustrated by the following specific embodiments.

*Example 1*

A reaction mixture was prepared by dissolving 2.0 g. of a concentrate of gamma-tocopherol (72.5% total tocopherol by Emmerie-Engel assay, of which tocopherol 92.5% was non-alpha tocopherol by chemical assay), and 0.66g. of potassium hydroxide in 20 ml. of peroxide-free dioxane. A trace of water was added to the dioxane to completely dissolve the potassium hydroxide. The resulting solution was refluxed and nitrogen was bubbled through it while a total of 4.3 g. of chloroform was added dropwise over a ten minute period. The solution was thereafter refluxed for 75 minutes and then cooled. The resulting reaction product was hydrolyzed by acidifying the reaction solution with 5% aqueous sulfuric acid and heating the acidified solution for 45 minutes at 60° C. The 5-formyl gamma-tocopherol was recovered as an oily concentrate by extracting the reaction solution with ether, washing the ether extract to neutrality and drying it over sodium sulfate and removing the solvent by evaporation. The residual oil recovered weighed 2.05 g. and assayed for 43.2% tocopherol by Emmerie-Engel assay. The percent of the substituent formyl group was verified by infrared analysis and by reaction with 2,4-dinitrophenyl hydrazine. The ultraviolet absorption maximum of the product oil was 290 m$\mu$ as compared to 297 m$\mu$ for the original material being treated.

Other low potency tocopherols having an aromatic hydrogen atom on the benzenoid nucleus are formylated in similar manner. Beta-tocopherol treated as in the above example gives 7-formyl beta-tocopherol, while delta-tocopherol gives a mixture of 5-formyl delta-tocopherol and 5,7-formyl delta-tocopherol. The formylation proceeds in similar fashion using other trihalomethanes such as iodoform and bromoform and with other alkaline materials such as sodium hydroxide and potassium carbonate.

*Example 2*

The reduction of substituent formyl groups on the tocopherol nucleus is readily effected by means of zinc and mineral acid. In a typical example, 5-formyl gamma-tocopherol was dissolved in isopropyl ether, and mixed with zinc dust and concentrated hydrochloric acid. The reaction mixture was heated with stirring for 2 hours at 45° C. to effect reduction of the formyl group in the 5 position to a methyl group. The product was isolated by extracting the mixture with ether, washing the ether extract to neutrality and removing the solvent by evaporation. The resulting concentrate of alpha-tocopherol had $$E^{1\%}_{1 cm.}(294\ m\mu) = 59.2$$

and the presence of the alpha-tocopherol was verified by preparation of the acid succinate melting at 76–77° C.

Similar reduction of substituent formyl groups to methyl groups was achieved by the Clemmensen procedure using a zinc-mercury amalgam and a mineral acid. An efficacious method, particularly for reducing the two substituent formyl groups in 5,7-formyl delta-tocopheral, involved treating the formylated tocopherol with an 0.8 N. solution of lithium aluminohydride in ether, refluxing the mixture for 25 minutes, hydrolyzing the resulting product with 5% aqueous mineral acid and thereafter treating it with zinc amalgam and hydrochloric acid.

Reduction of formyl groups to methyl groups is readily effected employing formyl tocopheryl esters as well as the free formyl tocopherols. Free and formylated tocopherols are readily esterified by reaction with an acid chloride such as benzoyl chloride, palmityl chloride or similar acyl halide as well as with anhydrides such as acetic anhydride or the like. In many cases, the enhanced stability of tocopheryl esters is desirable and the fatty acid esters, particularly of the fatty acids having not more than 20 carbon atoms are preferably prepared as, for example, the palmitate, myristate, stearate and oleate esters.

The formylated tocopherols and tocopheryl esters are biologically active compounds useful as therapeutic agents and can be used without reduction of the substituent formyl groups. They are particularly useful, however, as intermediates in the conversion of relatively low potency tocopherols to alpha-tocopherol. This invention thus provides a simple and effective method of formylating non-alpha tocopherols to give biologically active derivatives which are readily reducible to material having substantially greater vitamin E biological activity.

While the invention has been described in considerable detail with reference to certain preferred embodiments thereof, variations and modifications can be effected within the spirit and scope of the invention as described hereinabove and as defined in the appended claims.

What I claim is:

1. The method of making biologically active material which is convertible by reduction to material having high vitamin E biological activity which comprises reacting tocopherol material normally possessing relatively low vitamin E activity and characterized by having at least one aromatic hydrogen atom on the benzenoid nucleus with a trihalomethane and an alkaline material, and hydrolyzing the product of said reaction, said reacting and hydrolyzing being effective to introduce at least one formyl group on the nucleus of said tocopherol material in a position normally occupied by said aromatic hydrogen atom.

2. The method of making biologically active material which is convertible by reduction to material having substantially enhanced vitamin E biological activity which comprises reacting tocopherol material normally possessing relatively low vitamin E activity and having at least one aromatic hydrogen atom on the nucleus with a trihalomethane and an inorganic alkaline material, and hydrolyzing the product of said reacting, said reacting and hydrolyzing combining to replace said aromatic hydrogen atom with a formyl group.

3. The method of making a biologically active material which is readily reducible to material of substantially enhanced vitamin E biological activity which comprises reacting with a trihalomethane and an alkaline material, a tocopherol compound characterized by having at least one aromatic hydrogen atom on the nucleus and being selected from the class consisting of beta-tocopherol, gamma-tocopherol and delta-tocopherol, and hydrolyzing the product of said reacting, said reacting and hydrolyzing combining to formylate said tocopherol compound in at least one position normally occupied by an aromatic hydrogen atom.

4. The method of making biologically active material which is convertible by reduction to material having high vitamin E activity which comprises reacting a tocopherol compound having at least one aromatic hydrogen atom on the nucleus and being selected from the class consisting of beta-tocopherol, gamma-tocopherol and delta-tocopherol with a trihalomethane and a group I-A metal hydroxide, and hydrolyzing the product of said reacting, said reacting and hydrolyzing in combination being effective to introduce at least one formyl group on the nucleus of said tocopherol compound in a position normally occupied by said aromatic hydrogen atom.

5. The method of making biologically active material which is convertible by reduction to material having enhanced vitamin E biological activity which comprises reacting chloroform and a group I-A metal hydroxide with a tocopherol compound having at least one aromatic hydrogen atom on the nucleus and being selected from the class consisting of beta-tocopherol, gamma-tocopherol and delta-tocopherol, and hydrolyzing the product of said reacting, said reacting and hydrolyzing being effective in combination to replace said aromatic hydrogen atom with a formyl group.

6. The method of making a biologically active delta-tocopherol derivative which comprises introducing a formyl group into at least one of the 5 and 7 positions on the nucleus of delta-tocopherol by reacting delta-tocopherol with chloroform and a group I-A metal hydroxide, and hydrolyzing the product of said reacting.

7. The method of making a biologically active gamma-tocopherol derivative which is convertible by reduction to alpha-tocopherol which comprises introducing a formyl group in the 5 position on the nucleus of gamma-tocopherol by reacting gamma-tocopherol with chloroform and a group I-A metal hydroxide, and hydrolyzing the product of said reacting.

8. The method of making a biologically active beta-tocopherol derivative which is convertible by reduction to alpha-tocopherol which comprises replacing the aromatic hydrogen atom in the 7 position on the nucleus of beta-tocopherol with a formyl group by reacting beta-tocopherol with chloroform and a group I-A metal hydroxide, and hydrolyzing the product of said reacting.

9. The method of making a biologically active delta-tocopherol derivative which is convertible by reduction to alpha-tocopherol which comprises replacing the aromatic hydrogen atoms in the 5 and 7 positions on the nucleus of delta-tocopherol with formyl groups by reacting delta-tocopherol with chloroform and a group I-A metal hydroxide, and hydrolyzing the product of said reacting.

10. The method of enhancing the vitamin E biological activity of relatively low potency tocopherol material which comprises formylating and reducing tocopherol material characterized by having at least one aromatic hydrogen atom on the benzenoid nucleus and thereby replacing said aromatic hydrogen atom with a substituent methyl group, said formylating being effected by reacting said tocopherol material with a trihalomethane and an alkaline material, and hydrolyzing the product of said reacting.

11. The method of enhancing the vitamin E biological activity of relatively low potency tocopherol material which comprises formylating and reducing a tocopherol compound having at least one aromatic hydrogen atom on the benzenoid nucleus and being selected from the class consisting of beta-tocopherol, gamma-tocopherol and delta-tocopherol, and thereby introducing a substituent methyl group in the position normally occupied by said aromatic hydrogen atom, said formylating being effected by reacting said tocopherol compound with a trihalomethane and an alkaline material, and hydrolyzing the product of said reacting.

12. The method of enhancing the vitamin E biological activity of relatively low potency tocopherol material which comprises formylating and reducing a tocopherol compound having at least one aromatic hydrogen atom on the nucleus and being selected from the class consisting of beta-tocopherol, gamma-tocopherol and delta-tocopherol and thereby replacing said aromatic hydrogen atom with a substituent methyl group, said formylating being effected by reacting said tocopherol compound with a trihalomethane and a group I-A metal hydroxide and hydrolyzing the product of said reacting.

13. The method of enhancing the vitamin E biological activity of gamma-tocopherol which comprises formylating and reducing gamma-tocopherol and thereby introducing a substituent methyl group in the 5 position of said gamma-tocopherol, said formylating being effected by reacting said gamma-tocopherol with a trihalomethane and a group I-A metal hydroxide and hydrolyzing the product of said reacting.

14. The method of enhancing the vitamin E biological activity of beta-tocopherol which comprises introducing a substituent methyl group in the 7 position on the nucleus of beta-tocopherol by formylating and reducing beta-tocopherol, said formylating being effected by reacting said beta-tocopherol with a trihalomethane and a group I-A metal hydroxide and hydrolyzing the product of said reacting.

15. The method which comprises replacing at least one of the aromatic hydrogen atoms in the 5 and 7 positions on the nucleus of delta-tocopherol with a methyl group by formylating and reducing delta-tocopherol, said formylating being effected by reacting said delta-tocopherol with a trihalomethane and a group I-A metal hydroxide and hydrolyzing the product of said reacting.

16. The method of enhancing the vitamin E biological activity of delta-tocopherol which comprises introducing a substituent methyl group into each of the 5 and 7 positions on the nucleus of delta-tocopherol by formylating and reducing delta-tocopherol, said formylating being effected by reacting said delta-tocopherol with a trihalomethane and a group I-A metal hydroxide and hydrolyzing the product of said reacting.

17. In the process of enhancing the vitamin E biological activity of tocopherol material normally possessing lower vitamin E activity by formylating and reducing said tocopherol material, the method of effecting said formylating which comprises reacting tocopherol material selected from the class consisting of beta-tocopherol, gamma-tocopherol, and delta-tocopherol, with chloroform and an alkali metal hydroxide, and hydrolyzing the product of said reacting with aqueous acid.

LEONARD WEISLER.

REFERENCES CITED

The following references are of record in the file of this patent:

Beilstein, "Handbuch der Organischen Chemie," Ed. 4, vol. 8, pp. 31 and 34. Springer, Berlin, 1925.